2,856,103

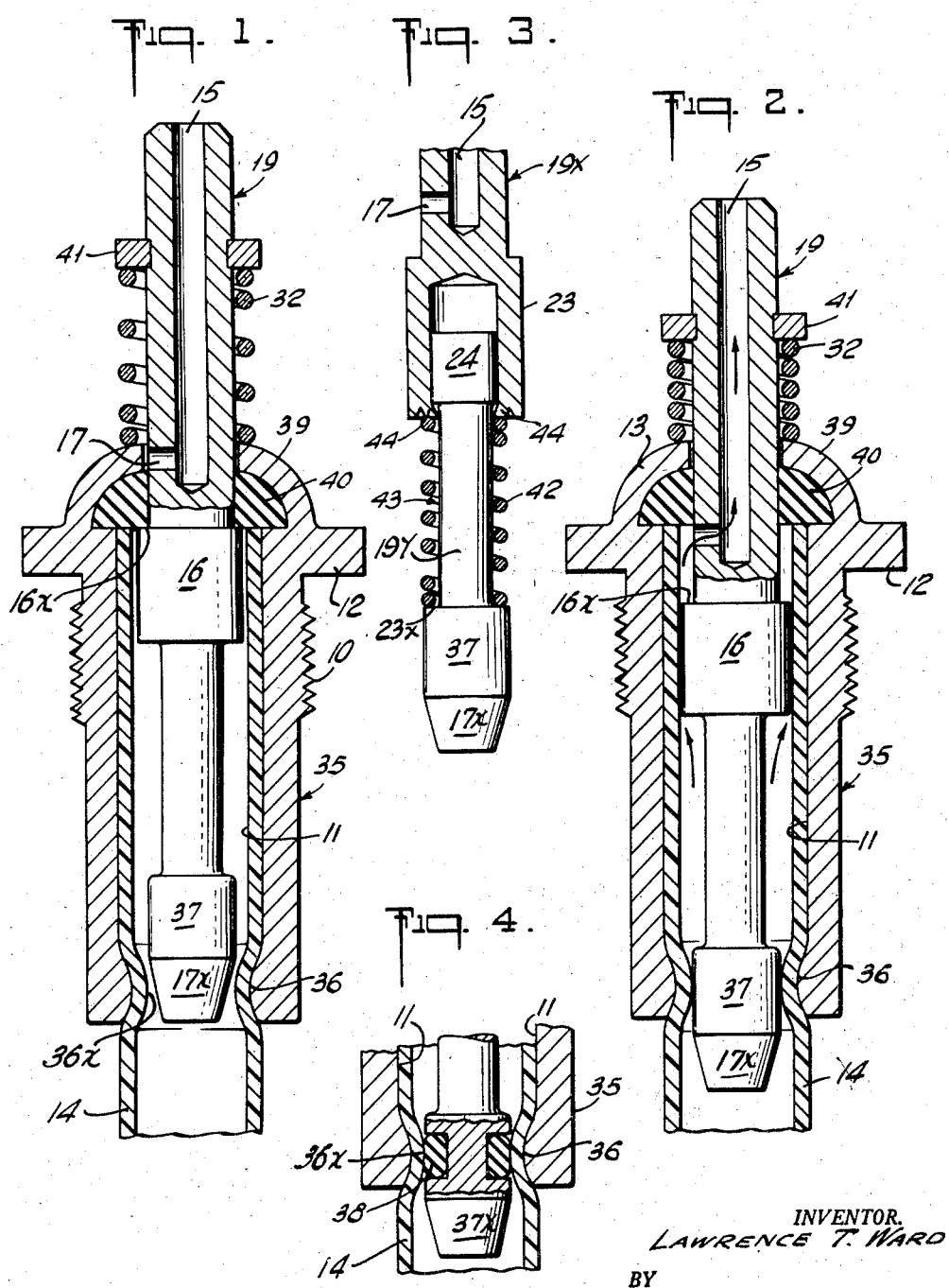

SPRAY VALVE HAVING SYPHON TUBE METERING CHAMBER

Lawrence T. Ward, Portland, Pa.

Application July 31, 1956, Serial No. 601,293

2 Claims. (Cl. 222—394)

This invention relates to metered spray valves to dispense a definite amount of self-propellant liquids and more particularly to metered spray valves having a syphon tube functioning also as a metering chamber.

It is an object of this invention to provide a metered spray valve wherein the syphon tube functions also as a metering chamber.

It is also an object of this invention to provide a spray valve for dispensing fluid uncontaminated with metal from contacting valve parts.

It is a further object to provide a metered spray valve having a minimum of metal parts coming in contact with the fluid being dispensed.

These and other objects will become apparent upon reading the following disclosure taken in conjunction with the drawing in which:

Fig. 1 is a detailed vertical section of the valve showing the manner of inserting the syphon tube into the valve housing and showing further the valve parts in closed position, Fig. 2 is a view similar to that of Fig. 1 but showing the valve parts in open or spraying position, Fig. 3 is a vertical section broken away in part, of a modified plunger and Fig. 4 is a vertical section broken away in part and showing a modified plunger closure head.

Referring to the drawing, the cylindrical valve of this invention has a screw threaded housing 35 the threads 10 thereof being disposed on the exterior of the housing wall and adapted to engage a threaded aperture of the conventional pressure resistant container (not shown) used with self-propellants such as Freon.

The cylindrical valve housing 35 is tubular and is provided with an enlarged tubular bore 11 which converges to a throat aperture 36 at the base of the housing. This aperture 36 functions as a valve in conjunction with a co-acting plunger 19 or 19X having an aperture closure head 37 having a conical guide 37X integral therewith.

The housing 35 is provided with a collar 12 which rests against the conventional spray container (not shown) when the valve is hermetically screwthreaded in the aperture thereof. An upright cylindrical wall 13 is provided integral to the top of collar 12, said wall 13 being spun or bent over (Figs. 1 and 2) to captively retain a combined sealing gasket and valve seat 40.

A syphon tube 14 preferably of plastic or rubber is disposed in the housing 35 and against chamber wall 11 and sealing gasket 40. The syphon tube 14 dips into the self-propellant liquid of the container so that the syphon tube 14 is normally completely filled with self-propellant liquid including the section of syphon tube 14 disposed with in the housing 35.

An integral plunger 19 having a top tubular section having a bore-hole 15 therein is provided with an enlarged cylindrical middle section collar 16 and a bottom solid plunger section terminating in a closure head 37 having a terminal guide point 37X.

The bore hole 15 of the top plunger section communicates adjacent its base with a lateral conduit 17 disposed suitably above the horizontal top wall 16X of collar 16. The plunger 19 in normal or closed position effects a gas tight seal between the rubber sealing ring 40 and the flat circular surface 16X of the top of the collar 16. Ring 40 also effects at all times a hermetical gas-tight seal against the exterior wall of the top plunger section permitting lateral conduit 17 to pass below the ring 40 when the plunger is suitably depressed. But normally the lateral conduit 17 (Fig. 1) is disposed above ring 40 when the valve is in non-operative or closed position.

The plunger 19 in normal position (Fig. 1) has its closure head 17X disposed loosely in aperture 36X of the syphon tube so that liquid communication is established between the metering chamber of the syphon tube disposed interiorly of housing wall 11 and the remainder of the syphon tube disposed below valve housing 35. The valve aperture 36X of syphon tube 14 is disposed adjacent to throat aperture 36 of the valve housing and is formed by said aperture 36 upon forcing the plastic tube 14 into housing 35 and thence against sealing ring 40.

The plunger is actuated by a coil spring 32 placed around the top plunger stem (Figs. 1 and 2) and exteriorly of the valve housing the spring 32 being disposed upon the turned over wall, that is upon the apertured dome 39 and also against a ring washer 41 secured in a suitable groove in plunger 19. The spring normally urges the collar 16 out of the metering chamber and against ring 40.

As shown in Fig. 1, the diameter of the cylindrical plunger collar 16 is suitably less than the diameter of the metering chamber formed by the inner walls of the syphon tube adjacent wall 11 of valve housing 35, thereby permitting liquid or fluid passage therebetween.

A finger knob (not shown) having a bore-hole therethrough and of conventional plastic manufacture is press fitted upon the exposed top stem of plunger 19 with the bore-hole 15 communicating with the bore-hole of the knob.

In assembling the valve, the ring 40 is disposed upon the top plunger stem and against collar 16 and the unit is then placed in the housing 35 with the guide point 37X disposed adjacent the aperture 36. The upright wall 39 is then spun or turned over to form the dome 39 thereby pressing the ring 40 in hermetical gas-tight relationship against the outside wall of the top plunger stem. The resilient suitably round syphon tube 14 is inserted into the housing 35 through aperture 36 until it is firmly pressed against sealing ring 40. The coil spring is placed over the top plunger stem and the washer 41 is affixed to make the assembled metering spray valve of this invention.

In operating the valve affixed to a container the depression of plunger 19 causes first the closure head 37 to engage the interior plastic wall of syphon tube 14 at the aperture wall 36X in a gas-tight manner, and then suitable further depression of the plunger 19 causes lateral conduit 17 to pass below ring 40 to communicate with the liquid present in the cut-off or metering chamber of the syphon tube adjacent the housing 11 wall. The self-propellant then partially evaporates and expels itself as a spray up bore-hole 15 and out of the conventional finger knob disposed thereover. The gas-tight seal between sealing ring 40 and the top plunger stem is maintained at all times even during the sliding of the plunger 19 through ring 40.

Upon release of finger pressure on the knob of the plunger 19, the spring 32 returns the plunger to its normal position causing conduit 17 to pass upwardly beyond ring 40 and collar 16 to effect a hermetic seating of collar shoulder 16X against the bottom wall of ring 40 (Fig. 1)

and returns the closure head guide point 37 loosely in aperture 36X thereby permitting the self-propellant liquid in the container to be forced into the metering chamber of housing 35.

To effect an improved valve closure seal between the closure head and the wall of aperture 36X the head 37 may be provided with suitable circular groove in which a suitable sealing ring 38 is disposed. Plunger 19 is preferably made of noncorrosive material such as suitable metal alloy or even glass. The rubber ring 38 contact to plastic syphon tube 14 effects an improved seal over the seal effected between a plastic tube 14 and a metal head 37.

A further modification of this invention is shown in Fig. 3. In this modification the identical valve housing 35 and sealing ring 40 as well as the syphon tube 14 are used. Only the plunger is changed. In this modification of Fig. 3 an articulated plunger is used and consists of two plunger sections, namely a top plunger section 19X having an integral but cavitated collar 23 and a bottom plunger section 19Y having an enlarged head 24 adapted to smoothly fit into the cavity of collar 23. The plunger head 24 is movable in the cavity of collar 23 but is permanently and captively held therein by peening over the metal by forming suitable peen prongs 44 at the mouth of the cavity. These prongs 44 are disposed against the cylindrical surface of the plunger stem 19Y so that the head 24 can not be pulled out of its cavity in collar 23.

A coil spring 42 is disposed about the bottom plunger stem and against closure head 42 and also against the peen prongs 44 (Fig. 3).

In this modification (Fig. 3), in assembling the plunger the spring 42 is disposed on the bottom plunger stem and then the head 24 thereof is inserted into the cavity of collar 23 whereupon the metal of collar 23 is peened over forming peen prongs 44 to captively retain head 24 in the cavity of collar 23.

In operating the plunger of Fig. 3, the plunger exhibits a delayed action effect. Thus the lowering of plunger top section 19X does not grippingly cut off the syphon tube 14 since the spring 42 is being compressed while head 37 is being inserted in aperture 36X thus causing the head 24 of plunger bottom 19Y to move into the cavity of collar 23. After plunger head 24 has moved into the cavity of collar 23 its further movement is stopped by hitting the top wall of said cavity whereupon the plunger bottom 19Y and its closure head 37 is firmly pushed into gas-tight relationship with syphon tube 14. This action permits any gases trapped in or associated with the fluid in the syphon tube to escape thereby preventing vapor lock. The lateral conduit 17 in connection with its co-acting sealing ring 40 functions in its normal manner as in the modifications of Figs. 1 and 2. In this modification (Fig. 3) the spring 42 is disposed in the metering chamber and thereby contacts the fluid being dispensed. The circular collar seat 23X functions identically to collar seat 16X described above.

The plunger of this spray valve is substantially non-tilting as it is held firmly in place by sealing ring 40 at all times and in valve open (Fig. 2) the plunger stem 19 is non-tiltingly held at two widely spaced-apart points by ring 40 and the wall of aperture 36X. The path of travel of all of the fluid of the metering chamber is shown by arrows in Fig. 2 when the top plunger stem 19 is fully depressed to its extreme limit.

Having read this disclosure, other obvious variants will now become apparent to those skilled in the art, but all these variations and modifications of the scientific principle taught above are deemed to be within the scope and the claims of this invention.

This application is a continuation-in-part of Serial Number 450,177, filed Aug. 16, 1954, now Patent No. 2,788,925.

Furthermore while the housing of this invention has been illustrated as having screw threads or other means of securing the valve housing to the container in lieu of screw threads may be used, for example, a clamp may be used to screw the housing to a glass bottle as shown in said Serial Number 450,177, filed Aug. 16, 1954, now Patent No. 2,788,925.

I claim:

1. A metering spray valve for self-propellant liquids comprising a tubular cylindrical valve housing having an enlarged diameter metering chamber borehole converging into a restricted borehole aperture adjacent the bottom of the borehole, said housing having screw threaded means for securing to a high pressure resistant container and having further an annular integral retaining collar above said screw threaded means and in space relationship to said borehole; a non-metal resilient syphon tube disposed in said housing borehole lining the entire borehole and extending downwardly therefrom; a non-tilting integral plunger having a top section having a top borehole therein communicating with a lateral opening at the base of the borehole, an enlarged middle section integral with the bottom of said top plunger section and having a circular flat top wall and a bottom plunger section integral with said middle section and having a valve head at its extremity, said plunger having its bottom section and middle section disposed normally in close spaced relationship within the syphon tube located in the housing borehole; a sealing ring disposed seizingly about said top plunger section and within said annular collar of said housing for effecting a hermetical seal continuously with the plunger top section, said ring also extending within the borehole for effecting an intermittent hermetical seal between the bottom of said sealing ring and the flat top wall of said middle section, and spring means secured about said plunger for urging said plunger continuously outwardly from said housing whereby inward movement of said plunger into said housing first causes said valve head to close the restricted tube portion within said housing and subsequently causes the lateral opening of the plunger top section to pass below said sealing ring to establish communication with the liquid within the syphon tube in the housing borehole thereby permitting the liquid contents of the housing borehole to be dispensed into and through the top plunger section.

2. The valve of claim 1 wherein the plunger is an articulated plunger having a separate bottom plunger section held captively and moveably within an enlarged cavity within said middle plunger section and said articulated plunger having further a secondary coil spring disposed about the bottom plunger section and between said plunger middle section and said valve head of said bottom plunger section, said secondary spring continuously urging said valve head and the bottom plunger section away from the plunger middle section.

References Cited in the file of this patent

UNITED STATES PATENTS

| | | |
|---|---|---|
| 1,342,173 | Joslin | June 1, 1920 |
| 1,892,750 | Rotheim | Jan. 3, 1933 |
| 2,562,111 | Michel | July 24, 1951 |
| 2,667,991 | Boyer | Feb. 2, 1954 |
| 2,721,010 | Meshberg | Oct. 18, 1955 |
| 2,746,796 | St. Germain | May 22, 1956 |
| 2,747,775 | Pritchard | May 29, 1956 |